(12) United States Patent
Jang

(10) Patent No.: US 6,178,289 B1
(45) Date of Patent: Jan. 23, 2001

(54) VIDEO DATA SHUFFLING METHOD AND APPARATUS

(75) Inventor: Jae-Dae Jang, Suwon (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 08/884,267

(22) Filed: Jun. 27, 1997

(30) Foreign Application Priority Data

Jun. 29, 1996 (KR) .................................................. 96-26252

(51) Int. Cl.$^7$ ...................................................... H04N 5/92
(52) U.S. Cl. .......................................... 386/112; 386/124
(58) Field of Search .............................. 386/46, 111, 112, 386/124, 131; 348/448, 446, 420; H04N 5/92

(56) References Cited

U.S. PATENT DOCUMENTS 5,646,695 * 7/1997 Fujiwara et al. ..................... 348/448
5,677,981 * 10/1997 Kato et al. ............................ 386/112
5,699,475 * 12/1997 Oguro et al. ......................... 386/112

* cited by examiner

Primary Examiner—Huy Nguyen

(74) Attorney, Agent, or Firm—Sughrue, Mion, Zinn Macpeak & Seas, PLLC

(57) ABSTRACT

A video shuffling apparatus shuffles video data in a memory having a storage capacity of video data of one frame, based on a shuffling system of digital video cassette recorder (VCR) standard. A first address generation unit generates a first interlace address and a first shuttle address according to interlace addressing shuffle addressing based on the shuffling system of the VCR standard. A second address generation unit generates a second interlace address and a second shuffle address having relationship that a second shuffle address for reading out video data of a previous frame from the memory is the same as a second interlace address for writing video data of a current frame in the memory, and a second shuffle address for reading out video data of the current frame from the memory is the same as a second interlace address for writing video data of next frame in the memory. A control unit controls the memory according to one mode of a first mode for reading out video data recorded on the memory using the second shuffle address and writing input video data in the memory using a second interlace address, and a second mode for writing input video data in the memory using a second shuffle address and reading out video data recorded on the memory using a second interlace address. Thus, the present invention can continuously perform a shuffling operation with regard to frames of video data.

11 Claims, 21 Drawing Sheets

| 0 | 5 | 6 | 11 | 12 | 17 | 18 | 23 | 24 |
|---|---|---|----|----|----|----|----|----|
| 1 | 4 | 7 | 10 | 13 | 16 | 19 | 22 | 25 |
| 2 | 3 | 8 | 9  | 14 | 15 | 20 | 21 | 26 |

← B-TYPE MACRO BLOCK FOR PAL

FIG. 2E
PRIOR ART

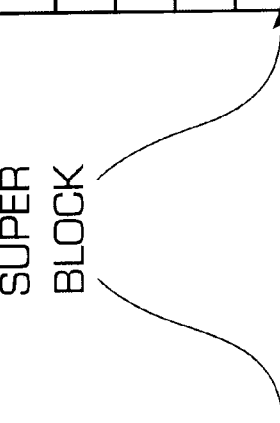

135 X 8 PIXELS

576 LINES

RECONSTRUCTION 2,160 PIXELS

288 LINES

FIG. 5A

| | FIG. 5A (1) |
|---|---|
| | FIG. 5A (2) |

FIG. 5A (1)

| WRITE | 1 | 2 | 3 | 4 | 5 | 6 | 7 | 8 | 9 | 10 | 11 | 12 | 13 |
|---|---|---|---|---|---|---|---|---|---|---|---|---|---|
| READ | x | 1 | 2 | 3 | 4 | 5 | 6 | 7 | 8 | 9 | 10 | 11 | 12 |
| 0 | 0 | 0 | 0 | 0 | 0 | 0 | 0 | 0 | 0 | 0 | 0 | 0 | 0 |
| 18 | 9 | 22 | 11 | 23 | 29 | 32 | 16 | 8 | 4 | 2 | 1 | 18 |
| 1 | 18 | 9 | 22 | 11 | 23 | 29 | 32 | 16 | 8 | 4 | 2 | 1 |
| 19 | 27 | 31 | 33 | 24 | 17 | 26 | 13 | 29 | 32 | 16 | 8 | 4 | 2 |
| 2 | 1 | 18 | 9 | 22 | 11 | 23 | 29 | 32 | 16 | 8 | 4 | 2 | 3 |
| 20 | 10 | 5 | 20 | 10 | 5 | 20 | 10 | 5 | 20 | 10 | 5 | 20 | 10 |
| 3 | 19 | 27 | 31 | 33 | 24 | 17 | 26 | 13 | 29 | 32 | 16 | 8 | 4 |
| 21 | 28 | 14 | 7 | 21 | 28 | 14 | 7 | 21 | 28 | 14 | 7 | 21 | 28 |
| 4 | 2 | 1 | 18 | 9 | 22 | 11 | 23 | 29 | 32 | 16 | 8 | 4 | 2 |
| 22 | 11 | 23 | 29 | 32 | 16 | 8 | 4 | 2 | 1 | 18 | 9 | 22 | 11 |
| 5 | 20 | 10 | 5 | 20 | 10 | 5 | 20 | 10 | 5 | 20 | 10 | 5 | 20 |
| 23 | 29 | 32 | 16 | 8 | 4 | 2 | 1 | 18 | 9 | 22 | 11 | 23 | 29 |
| 6 | 3 | 19 | 27 | 31 | 33 | 24 | 17 | 26 | 13 | 29 | 32 | 16 | 8 |
| 24 | 12 | 6 | 3 | 19 | 27 | 3 | 19 | 27 | 3 | 19 | 27 | 3 | 19 |
| 7 | 21 | 28 | 14 | 7 | 21 | 28 | 14 | 7 | 21 | 28 | 14 | 7 | 21 |
| 25 | 30 | 15 | 25 | 30 | 15 | 25 | 30 | 15 | 25 | 30 | 15 | 25 | 30 |
| 8 | 4 | 2 | 1 | 18 | 9 | 22 | 11 | 23 | 29 | 32 | 16 | 8 | 4 |

FIG. 5A (2)

| 14 | 15 | 16 | 17 | 18 | 19 | 20 | 21 | 22 | 23 | 24 | 25 | 26 |
|---|---|---|---|---|---|---|---|---|---|---|---|---|
| 13 | 14 | 15 | 16 | 17 | 18 | 19 | 20 | 21 | 22 | 23 | 24 | 25 |
| 0 | 0 | 0 | 0 | 0 | 0 | 0 | 0 | 0 | 0 | 0 | 0 | 0 |
| 9 | 22 | 11 | 23 | 29 | 32 | 16 | 8 | 4 | 2 | 1 | 18 | 9 |
| 18 | 9 | 22 | 11 | 23 | 29 | 32 | 16 | 8 | 4 | 2 | 1 | 18 |
| 27 | 31 | 33 | 24 | 17 | 26 | 13 | 29 | 32 | 16 | 8 | 4 | 19 | 27 |
| 1 | 18 | 9 | 22 | 11 | 23 | 29 | 32 | 16 | 8 | 4 | 2 | 1 |
| 5 | 20 | 10 | 5 | 20 | 10 | 5 | 20 | 10 | 5 | 20 | 10 | 5 | 20 |
| 19 | 27 | 31 | 33 | 24 | 17 | 26 | 13 | 29 | 32 | 16 | 6 | 3 |
| 2 | 1 | 18 | 9 | 22 | 11 | 23 | 29 | 32 | 16 | 8 | 4 | 7 | 21 | 28 |
| 28 | 14 | 7 | 21 | 28 | 14 | 7 | 21 | 28 | 14 | 7 | 21 | 28 |
| 4 | 2 | 1 | 18 | 9 | 22 | 11 | 23 | 29 | 32 | 16 | 8 | 4 |
| 23 | 29 | 32 | 16 | 8 | 4 | 2 | 1 | 18 | 9 | 22 | 11 | 5 | 20 |
| 10 | 5 | 20 | 10 | 5 | 20 | 10 | 5 | 20 | 10 | 5 | 20 | 10 |
| 13 | 29 | 32 | 16 | 8 | 4 | 2 | 1 | 18 | 9 | 22 | 6 | 3 |
| 3 | 19 | 27 | 3 | 19 | 27 | 33 | 34 | 17 | 33 | 27 | 13 | 24 | 7 | 21 |
| 14 | 7 | 21 | 28 | 14 | 7 | 21 | 28 | 14 | 7 | 21 | 28 | 14 | 7 | 21 |
| 25 | 30 | 15 | 25 | 30 | 15 | 25 | 30 | 15 | 25 | 30 | 15 | 25 | 30 |
| 2 | 1 | 18 | 9 | 22 | 11 | 23 | 29 | 32 | 16 | 8 | 4 |

| FIG. 5B (1) |
|---|
| FIG. 5B (2) |

FIG. 5B (1)

| WRITE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| READ | x | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|  | 0 | 9 | 31 | 24 | 2 | 10 | 14 | 16 | 17 | 18 | 19 | 20 | 21 | 22 | 23 | 24 | 25 | 26 | 27 | 28 | 29 | 30 | 31 | 32 | 30 | 29 | 28 | 27 | 26 | 25 | 23 | 13 |
| 18 | 0 | 9 | 31 | 24 | 2 | 10 | 14 | 16 | 15 | 14 | 13 | 12 | 11 | 10 | 9 | 8 | 7 | 6 | 5 | 4 | 3 | 2 | 1 | 0 | 7 | 30 | 24 | 18 | 13 | 8 | 3 | 8 |
| 1 | 27 | 22 | 2 | 10 | 14 | 16 | 17 | 35 | 5 | 29 | 23 | 20 | 1 | 27 | 22 | 2 | 10 | 14 | 16 | 17 | 35 | 26 | 4 | 11 | 32 | 7 | 30 | 1 | 27 | 22 | 32 | 28 |
| 19 | 18 | 0 | 9 | 31 | 24 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 32 | 7 | 8 |
| 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 32 | 7 | 30 | 1 | 27 | 22 | 32 | 24 | 23 |
| 20 | 1 | 27 | 22 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 32 | 7 | 30 | 1 | 3 |
| 3 | 28 | 5 | 29 | 23 | 20 | 1 | 27 | 22 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 25 | 18 |
| 21 | 19 | 18 | 0 | 9 | 31 | 24 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 19 | 34 |
| 4 | 11 | 32 | 7 | 30 | 1 | 27 | 22 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 2 | 14 |
| 22 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 32 | 7 | 30 | 1 | 27 | 22 | 5 | 29 |
| 5 | 29 | 23 | 20 | 1 | 27 | 22 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 0 | 9 |
| 23 | 20 | 1 | 27 | 22 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 32 | 7 | 9 | 24 |
| 6 | 12 | 15 | 34 | 8 | 13 | 33 | 25 | 21 | 19 | 18 | 0 | 9 | 31 | 24 | 2 | 10 | 14 | 16 | 17 | 35 | 26 | 4 | 11 | 32 | 7 | 30 | 1 | 27 | 22 | 2 | 31 | 4 |
| 24 | 3 | 28 | 5 | 29 | 23 | 20 | 1 | 27 | 22 | 2 | 10 | 14 | 16 | 17 | 35 | 26 | 4 | 11 | 32 | 7 | 30 | 1 | 27 | 22 | 2 | 10 | 14 | 16 | 13 | 33 | 26 | 19 |
| 7 | 30 | 1 | 27 | 22 | 2 | 10 | 14 | 16 | 17 | 35 | 26 | 4 | 11 | 32 | 7 | 30 | 1 | 27 | 22 | 2 | 10 | 14 | 16 | 17 | 35 | 26 | 4 | 11 | 32 | 7 | 21 | 35 |
| 25 | 21 | 19 | 18 | 0 | 9 | 31 | 24 | 2 | 10 | 14 | 16 | 17 | 35 | 26 | 4 | 11 | 32 | 7 | 30 | 1 | 27 | 22 | 2 | 10 | 14 | 16 | 17 | 35 | 16 | 17 | 12 | 15 |
| 8 | 13 | 33 | 25 | 21 | 19 | 18 | 0 | 9 | 31 | 24 | 2 | 10 | 14 | 16 | 17 | 35 | 26 | 4 | 11 | 32 | 7 | 30 | 1 | 27 | 22 | 2 | 10 | 14 | 11 | 6 | 7 | 30 |

| FIG. 5C (1) |
|---|
| FIG. 5C (2) |

| WRITE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| READ | x | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 3 | 22 | 9 | 25 | 33 | 8 | 30 | 0 | 3 | 17 | 29 | 35 | 27 | 15 | 34 | 28 | 17 | 4 | 5 | 23 | 20 | 1 | 27 | 31 | 2 | 18 | 4 | 12 | 9 | 25 | 33 | 1 | 31 |
| 1 | 18 | 12 | 31 | 18 | 9 | 19 | 25 | 33 | 19 | 14 | 0 | 3 | 22 | 17 | 13 | 27 | 15 | 28 | 17 | 4 | 5 | 23 | 29 | 35 | 21 | 34 | 27 | 5 | 4 | 12 | 32 | 21 | 23 |
| 2 | 19 | 30 | 0 | 3 | 22 | 9 | 25 | 33 | 8 | 30 | 19 | 14 | 17 | 24 | 35 | 15 | 8 | 7 | 24 | 14 | 28 | 20 | 5 | 2 | 13 | 1 | 31 | 21 | 18 | 35 | 20 | 33 | 5 |
| 3 | 20 | 13 | 27 | 34 | 2 | 14 | 10 | 8 | 18 | 7 | 24 | 31 | 35 | 14 | 10 | 8 | 18 | 27 | 22 | 14 | 15 | 25 | 7 | 10 | 1 | 28 | 17 | 29 | 4 | 5 | 13 | 29 | 9 |
| 4 | 21 | 31 | 14 | 10 | 8 | 7 | 24 | 31 | 21 | 25 | 3 | 35 | 8 | 0 | 3 | 22 | 14 | 4 | 15 | 5 | 28 | 15 | 24 | 31 | 13 | 18 | 27 | 2 | 34 | 13 | 27 | 34 | 2 |
| 5 | 22 | 14 | 5 | 23 | 32 | 1 | 21 | 15 | 28 | 18 | 17 | 4 | 3 | 22 | 19 | 6 | 1 | 10 | 23 | 32 | 7 | 24 | 35 | 13 | 28 | 12 | 9 | 35 | 2 | 19 | 30 | 0 | 4 |
| 6 | 23 | 5 | 23 | 32 | 1 | 21 | 31 | 28 | 12 | 9 | 35 | 2 | 6 | 6 | 6 | 6 | 6 | 6 | 6 | 6 | 6 | 6 | 6 | 6 | 6 | 6 | 6 | 6 | 6 | 34 | 27 | 2 | 5 |
| 7 | 24 | 6 | 6 | 6 | 6 | 6 | 6 | 6 | 6 | 6 | 6 | 6 | 6 | 6 | 6 | 6 | 21 | 31 | 18 | 12 | 9 | 25 | 33 | 19 | 30 | 32 | 3 | 22 | 14 | 10 | 34 | 2 | 6 |
| 8 | 25 | 15 | 28 | 17 | 29 | 35 | 27 | 13 | 27 | 29 | 35 | 13 | 23 | 5 | 23 | 29 | 35 | 31 | 21 | 34 | 17 | 12 | 18 | 33 | 19 | 13 | 27 | 20 | 22 | 14 | 18 | 21 | 7 |

| FIG. 5D (1) |
|---|
| FIG. 5D (2) |

| WRITE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|
| READ | x | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 0 | 0 | 12 | 12 | 0 | 12 | 12 | 0 | 12 | 12 | 0 | 12 | 12 | 0 | 12 | 12 | 0 | 12 | 12 | 0 | 12 | 12 | 0 | 12 | 12 | 0 | 12 | 12 | 0 | 12 |
| 18 | 3 | 31 | 27 | 25 | 24 | 6 | 15 | 19 | 21 | 22 | 5 | 32 | 10 | 17 | 20 | 4 | 14 | 1 | 30 | 9 | 34 | 11 | 35 | 29 | 26 | 7 | 33 | 28 | 8 |
| 1 | 30 | 9 | 34 | 11 | 35 | 29 | 26 | 7 | 33 | 28 | 8 | 16 | 2 | 13 | 18 | 3 | 31 | 27 | 25 | 24 | 6 | 15 | 19 | 21 | 22 | 5 | 32 | 10 | 17 |
| 19 | 21 | 22 | 5 | 32 | 10 | 17 | 20 | 4 | 14 | 1 | 30 | 9 | 34 | 11 | 35 | 29 | 26 | 7 | 33 | 28 | 8 | 16 | 2 | 13 | 18 | 3 | 31 | 27 | 25 |
| 2 | 13 | 18 | 3 | 31 | 27 | 25 | 24 | 6 | 15 | 19 | 21 | 22 | 5 | 32 | 10 | 17 | 20 | 4 | 14 | 1 | 30 | 9 | 34 | 11 | 35 | 29 | 26 | 7 | 33 |
| 20 | 4 | 14 | 1 | 30 | 9 | 34 | 11 | 35 | 29 | 26 | 7 | 33 | 28 | 8 | 16 | 2 | 13 | 18 | 3 | 31 | 27 | 25 | 24 | 6 | 15 | 19 | 21 | 22 | 5 |
| 3 | 31 | 27 | 25 | 24 | 6 | 15 | 19 | 21 | 22 | 5 | 32 | 10 | 17 | 20 | 4 | 14 | 1 | 30 | 9 | 34 | 11 | 35 | 29 | 26 | 7 | 33 | 28 | 8 | 16 |
| 21 | 22 | 5 | 32 | 10 | 17 | 20 | 4 | 14 | 1 | 30 | 9 | 34 | 11 | 35 | 29 | 26 | 7 | 33 | 28 | 8 | 16 | 2 | 13 | 18 | 3 | 31 | 27 | 25 | 24 |
| 4 | 14 | 1 | 30 | 9 | 34 | 11 | 35 | 29 | 26 | 7 | 33 | 28 | 8 | 16 | 2 | 13 | 18 | 3 | 31 | 27 | 25 | 24 | 6 | 15 | 19 | 21 | 22 | 5 | 32 |
| 22 | 5 | 32 | 10 | 17 | 20 | 4 | 14 | 1 | 30 | 9 | 34 | 11 | 35 | 29 | 26 | 7 | 33 | 28 | 8 | 16 | 2 | 13 | 18 | 3 | 31 | 27 | 25 | 24 | 6 |
| 5 | 32 | 10 | 17 | 20 | 4 | 14 | 1 | 30 | 9 | 34 | 11 | 35 | 29 | 26 | 7 | 33 | 28 | 8 | 16 | 2 | 13 | 18 | 3 | 31 | 27 | 25 | 24 | 6 | 15 |
| 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 | 23 |
| 6 | 15 | 19 | 21 | 22 | 5 | 32 | 10 | 17 | 20 | 4 | 14 | 1 | 30 | 9 | 34 | 11 | 35 | 29 | 26 | 7 | 33 | 28 | 8 | 16 | 2 | 13 | 18 | 3 | 31 |
| 24 | 6 | 15 | 19 | 21 | 22 | 5 | 32 | 10 | 17 | 20 | 4 | 14 | 1 | 30 | 9 | 34 | 11 | 35 | 29 | 26 | 7 | 33 | 28 | 8 | 16 | 2 | 13 | 18 | 3 |
| 7 | 33 | 28 | 8 | 16 | 2 | 13 | 18 | 3 | 31 | 27 | 25 | 24 | 6 | 15 | 19 | 21 | 22 | 5 | 32 | 10 | 17 | 20 | 4 | 14 | 1 | 30 | 9 | 34 | 11 |
| 25 | 24 | 6 | 15 | 19 | 21 | 22 | 5 | 32 | 10 | 17 | 20 | 4 | 14 | 1 | 30 | 9 | 34 | 11 | 35 | 29 | 26 | 7 | 33 | 28 | 8 | 16 | 2 | 13 | 18 |
| 8 | 16 | 2 | 13 | 18 | 3 | 31 | 27 | 25 | 24 | 6 | 15 | 19 | 21 | 22 | 5 | 32 | 10 | 17 | 20 | 4 | 14 | 1 | 30 | 9 | 34 | 11 | 35 | 29 | 26 |

| WRITE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| READ | x | 1 | 2 | 3 | 4 | 5 | 6 | 7 | 8 | 9 | 10 | 11 | 12 | 13 | 14 | 15 |
| 0 | 18 | 6 | 9 | 28 | 2 | 7 | 27 | 19 | 33 | 22 | 17 | 32 | 4 | 8 | 10 | 11 |
| 1 | 24 | 15 | 31 | 21 | 34 | 5 | 26 | 1 | 24 | 0 | 6 | 9 | 28 | 2 | 7 | 27 |
| 19 | 33 | 22 | 17 | 32 | 4 | 8 | 10 | 11 | 29 | 20 | 16 | 14 | 13 | 30 | 3 | 25 |
| 2 | 7 | 27 | 19 | 33 | 22 | 17 | 32 | 4 | 8 | 10 | 11 | 29 | 20 | 16 | 14 | 13 |
| 20 | 16 | 14 | 13 | 30 | 3 | 25 | 18 | 15 | 31 | 21 | 34 | 5 | 26 | 1 | 24 | 0 |
| 3 | 25 | 18 | 15 | 31 | 21 | 34 | 5 | 26 | 1 | 24 | 0 | 6 | 9 | 28 | 2 | 7 |
| 21 | 34 | 5 | 26 | 1 | 24 | 0 | 6 | 9 | 28 | 2 | 7 | 27 | 19 | 33 | 22 | 17 |
| 4 | 8 | 10 | 11 | 29 | 20 | 16 | 14 | 13 | 30 | 3 | 25 | 18 | 15 | 31 | 21 | 34 |
| 22 | 17 | 32 | 4 | 8 | 10 | 11 | 29 | 20 | 16 | 14 | 13 | 30 | 3 | 25 | 18 | 15 |
| 5 | 26 | 1 | 24 | 0 | 6 | 9 | 28 | 2 | 7 | 27 | 19 | 33 | 22 | 17 | 32 | 4 |
| 23 | 35 | 23 | 35 | 23 | 35 | 23 | 35 | 23 | 35 | 23 | 35 | 23 | 35 | 23 | 35 | 23 |
| 6 | 9 | 28 | 2 | 7 | 27 | 19 | 33 | 22 | 17 | 32 | 4 | 8 | 10 | 11 | 29 | 20 |
| 24 | 0 | 6 | 9 | 28 | 2 | 7 | 27 | 19 | 33 | 22 | 17 | 32 | 4 | 8 | 10 | 11 |
| 7 | 27 | 19 | 33 | 22 | 17 | 32 | 4 | 8 | 10 | 11 | 29 | 20 | 16 | 14 | 13 | 30 |
| 25 | 18 | 15 | 31 | 21 | 34 | 5 | 26 | 1 | 24 | 0 | 6 | 9 | 28 | 2 | 7 | 27 |
| 8 | 10 | 11 | 29 | 20 | 16 | 14 | 13 | 30 | 3 | 25 | 18 | 15 | 31 | 21 | 34 | 5 |

FIG. 5E (2)

| 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 29 | 20 | 16 | 14 | 13 | 30 | 3 | 25 | 18 | 15 | 31 | 21 | 34 | 5 | 26 | 1 |
| 19 | 33 | 22 | 17 | 32 | 4 | 8 | 10 | 11 | 29 | 20 | 16 | 14 | 13 | 30 | 3 |
| 18 | 15 | 31 | 21 | 34 | 5 | 26 | 1 | 24 | 0 | 6 | 9 | 28 | 2 | 7 | 27 |
| 30 | 3 | 25 | 18 | 15 | 31 | 21 | 34 | 5 | 26 | 1 | 24 | 0 | 6 | 9 | 28 |
| 4 | 8 | 10 | 11 | 29 | 20 | 16 | 14 | 13 | 30 | 3 | 25 | 18 | 15 | 31 | 21 |
| 27 | 19 | 33 | 22 | 17 | 32 | 4 | 8 | 10 | 11 | 29 | 20 | 16 | 14 | 13 | 30 |
| 32 | 4 | 8 | 10 | 11 | 29 | 20 | 16 | 14 | 13 | 30 | 3 | 25 | 18 | 15 | 31 |
| 5 | 26 | 1 | 24 | 0 | 6 | 9 | 28 | 2 | 7 | 27 | 19 | 33 | 22 | 17 | 32 |
| 31 | 21 | 34 | 5 | 26 | 1 | 24 | 0 | 6 | 9 | 28 | 2 | 7 | 27 | 19 | 33 |
| 8 | 10 | 11 | 29 | 20 | 16 | 14 | 13 | 30 | 3 | 25 | 18 | 15 | 31 | 21 | 34 |
| 3 | 25 | 18 | 15 | 31 | 21 | 34 | 5 | 26 | 1 | 24 | 0 | 6 | 9 | 28 | 2 |
| 16 | 14 | 13 | 30 | 3 | 25 | 18 | 15 | 31 | 21 | 34 | 5 | 26 | 1 | 24 | 0 |
| 29 | 20 | 16 | 14 | 13 | 30 | 3 | 25 | 18 | 15 | 31 | 21 | 34 | 5 | 26 | 1 |
| 33 | 22 | 17 | 32 | 4 | 8 | 10 | 11 | 29 | 20 | 16 | 14 | 13 | 30 | 3 | 25 |
| 7 | 27 | 19 | 33 | 22 | 17 | 32 | 4 | 8 | 10 | 11 | 29 | 20 | 16 | 14 | 13 |
| 26 | 1 | 24 | 0 | 6 | 9 | 28 | 2 | 7 | 27 | 19 | 33 | 22 | 17 | 32 | — |

VIDEO DATA SHUFFLING METHOD AND APPARATUS

BACKGROUND OF THE INVENTION

The present invention relates to a video data shuffling method and apparatus, and more particularly, to a video data shuffling method and apparatus for shuffling video data using a single memory.

In general, a digital video cassette recorder (VCR) shuffles video data in a predetermined range, for example, one frame according to a predetermined rule. Shuffling system of video data using an interlace addressing method and a shuffle addressing method according to an existing digital VCR standard will be described with reference to FIGS. 1A through 2G.

Video data of one frame is stored in a memory according to an interlace addressing method. To store video data of one frame in a memory, the interlace addressing method writes the video data of one frame on the memory in sequence from left to right for each line, in sequence from a second uppermost line to following even numbered lines for an odd field, and in sequence from a first uppermost line to following odd-numbered lines for an even field. Video data of one frame stored in the memory according to the interlace addressing method are divided into 50 super blocks as shown in FIG. 1A in the case of 525/60 system such as NTSC, and are divided into 60 super blocks as shown in FIG. 1B in the case of 625/50 system such as PAL. Each super block is composed of 27 macro blocks, and each macro block is composed of 6 discrete cosine transformation (DCT) blocks.

FIGS. 2A and 2G are views for explaining an shuffle addressing method according to an existing digital VCR standard to read video data stored in the memory. Referring to FIG. 2A, the shuffle addressing method performs a reading operation with respect to one DCT block having the size of 8×8 pixels, in sequence, from left to right in each line and from the upper line to the lower line for lines. Each macro block contained in a super block is classified into two types shown in FIGS. 2B and 2C. A-type macro block is composed of 6 DCT blocks as shown in FIG. 2B and the 6 DCT blocks are read in an ascending order of individually assigned numbers. That is, the DCT blocks contained in an A-type macro block are read in sequence from the left-most DCT block to the right most DCT block. B-type macro block is composed of 6 DCT blocks which are arranged in the form of a 3×2 array as shown in FIG. 2C. The DCT blocks belonging to the B-type macroblock also are read in an ascending order of individually assigned numbers. That is, two DCT blocks of each row are read in sequence from left to right and the rows of DCT blocks are read in sequence from the upper row of DCT blocks to the lower row of DCT blocks.

Referring to FIG. 2D showing three types of super block for the 525/60 system, macro blocks constituting each super block are read out from the memory in sequence from the lowest number to the highest number. In FIG. 2D, two types of super block located in relatively left-hand side are composed of the above-described A-type macro blocks, and different type of super block located in the right-hand side is composed of the A-type macro blocks and the B-type macro blocks which are indicated as numbers 24, 25 and 26. Referring to FIG. 2E showing a super block for the 625/50 system, the super block is composed of the above-described B type macro blocks which are read out in sequence from the lowest number to the highest number.

FIG. 2F shows super block arrangement for the 525/60 system, and FIG. 2G shows super block arrangement for the 625/50 system. As can be seen via comparison of FIGS. 2F and 2G, the super block arrangement for the 525/60 system is substantially the same as that for the 625/50 system. Therefore, video data of each frame in the 525/60 and that of the 625/50 systems are read out from a memory in the substantially same read sequence. When reading out super blocks of each system from the memory, assuming that numbers 0, 1, 2, 3, 4 and 5 are respectively assigned to each of super block columns in sequence from the left-most to the right-most, the super block columns can be read in sequence of 2, 1, 3, 0 and 4. Among the super blocks belonging to every super block column, the super block indicated as number "0" is read out firstly. For example, in one frame for the 525/60 system, a super block indicated as number "0" within a third super block column from the left-most of FIG. 2F is read out for the first time, and a super block indicated as number "0" in the second super block column from the left most of FIG. 2F is read out for the second time.

When video data is shuffled using the above-described shuffling system and a single memory, video data of one frame can be read via shuffle addressing only if the video data of the one frame is completely stored in the single memory via interlace addressing. Therefore, a new addressing method is required to continuously shuffle video data of a sequential frame using a single memory.

SUMMARY OF THE INVENTION

It is an object of the present invention to provide a continuously shuffling method for shuffling video data in sequential frames using a single memory by modifying interlace addressing and shuffle addressing for shuffling in a digital VCR standard, in order that video data of a next frame is written in the position of a memory from which video data of a current frame is read by the shuffle addressing.

It is another object of the present invention to provide a video shuffling apparatus for embodying the above method.

To accomplish the above object of the present invention, there is provided a video shuffling method using a single memory, the method comprising the steps of:

(a) generating a first interlace address and a first shuffle address in order to shuffle video data, in units of a frame, according to a shuffling system of digital video cassette recorder (VCR) standard;

(b) generating a second interlace address and a second shuffle address having relationship that a second shuffle address for reading out video data of a previous frame from the memory is the same as a second interlace address for writing video data of a current frame in the memory, and a second shuffle address for reading out video data of the current frame from the memory is the same as a second interlace address for writing video data of next frame in the memory; and (c) continuously shuffling video data of frames according to one mode of a first mode for writing input video data in the memory using a second interlace address and reading out video data recorded on the memory using a second shuffle address, and a second mode for writing input video data in the memory using a second shuffle address and reading out video data recorded on the memory using a second interlace address.

To accomplish another object of the present invention, there is provide a video shuffling apparatus for shuffling video data based on a shuffling system of digital video cassette recorder (VCR) standard, the video shuffling apparatus comprising:

first address generation means for generating a first interlace address and a first shuffle address according to interlace addressing and shuffle addressing based on the shuffling system; a memory which has a storage capacity for video data of one frame;

second address generation means for generating a second interlace address and a second shuffle address having relationship that a second shuffle address for reading video data of a previous frame from the memory is the same as a second interlace address for writing video data of a current frame in the memory, and a second shuffle address for reading video data of the current frame from the memory is the same as a second interlace address for writing video data of next frame in the memory; and control means for controlling the memory according to one mode of a first mode for writing input video data in the memory using a second interlace address and reading out video data recorded on the memory using a second shuffle address, and a second mode for writing input video data in the memory using a second shuffle and reading out video data recorded on the memory using a second interlace address, to thereby continuously shuffle video data frames.

BRIEF DESCRIPTION OF THE DRAWINGS

The preferred embodiments are described with reference to the drawings wherein:

FIGS. 1A and 1B are views showing a super block arrangement for shuffling in a digital VCR standard, in which FIG. 1A shows a super block arrangement with respect to a video frame for a 525/60 system, and FIG. 1B shows a super block arrangement with respect to a video frame for a 625/50 system;

FIGS. 2A through 2G are views for explaining shuffle addressing with respect to super block arrangement explained with reference to FIGS. 1A and 1B;

FIGS. 3A and 3B are views for explaining a memory reconstruction for shuffling according to the present invention, in which FIG. 3A shows a case of a 525/60 system, and FIG. 3B shows a case of a 625/50 system;

FIGS. 5A through 5E show tables for explaining substitution of the page address by the FIG. 4 apparatus;

DETAILED DESCRIPTION OF THE PREFERRED EMBODIMENT

A preferred embodiment of the present invention will be described in detail with reference to the accompanying drawings.

Figure 1B:
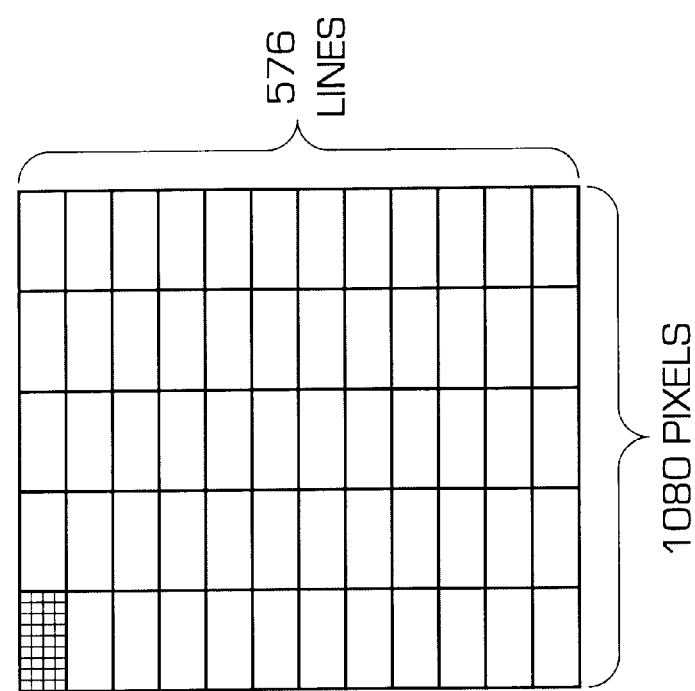
Figure 1A:
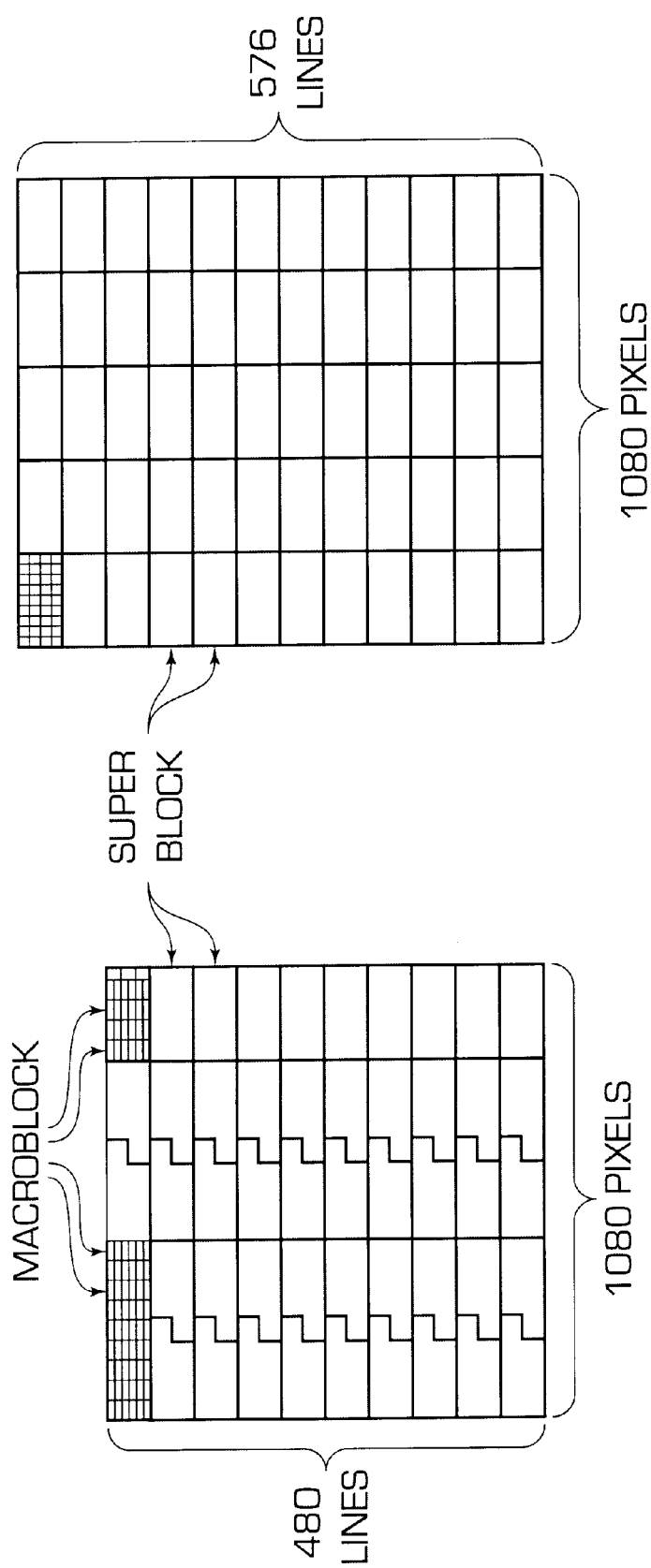
Figure 2C:
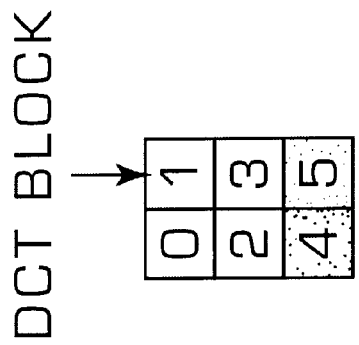
Figure 2B:
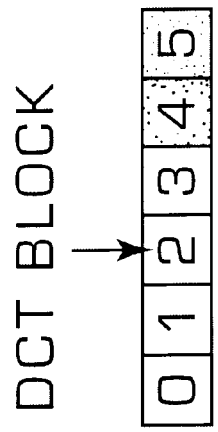
Figure 2A:
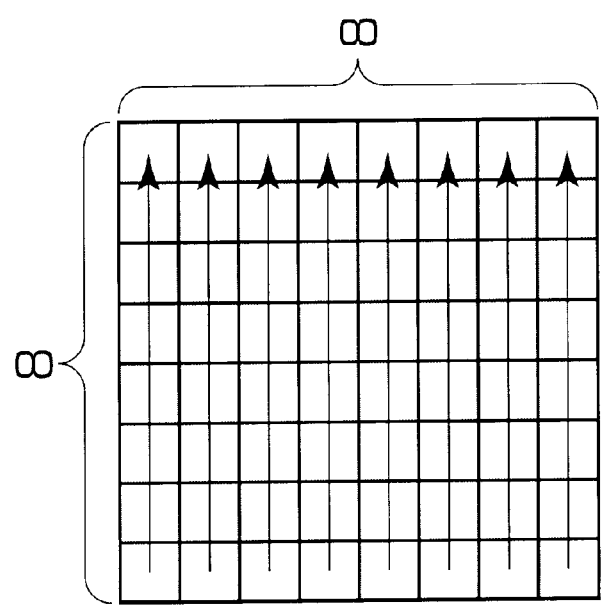

Referring to FIG. 2F showing a super block arrangement of a 525/60 system, which video data of one frame is written in a memory according to interlace addressing of the digital VCR standard, a starting point of time at which the video data of the frame can be initially read is substantially the same as that at which video data is recorded in a memory position corresponding to a first macro block in a super block expressed as "0" in a fourth super block column from the left-most, that is, the super block indicated as "A" in FIG. 2F. In other words, in case of the 525/60 system, since line numbers 23 through 262 are an odd field and line numbers 285 through 524 are an even field, if a time corresponding to about 485H (=285H+24H×8+8H, wherein H is a horizontal scanning line) lapses, video data recording in the memory can be read via shuffle addressing. Thus, to continuously perform shuffling with respect to video frames, whenever a memory portion becomes empty by a read operation, video data of next frame should be immediately filled in the empty memory portion and the filled video data can be shuffled via read operation for next frame.

Figure 2D:
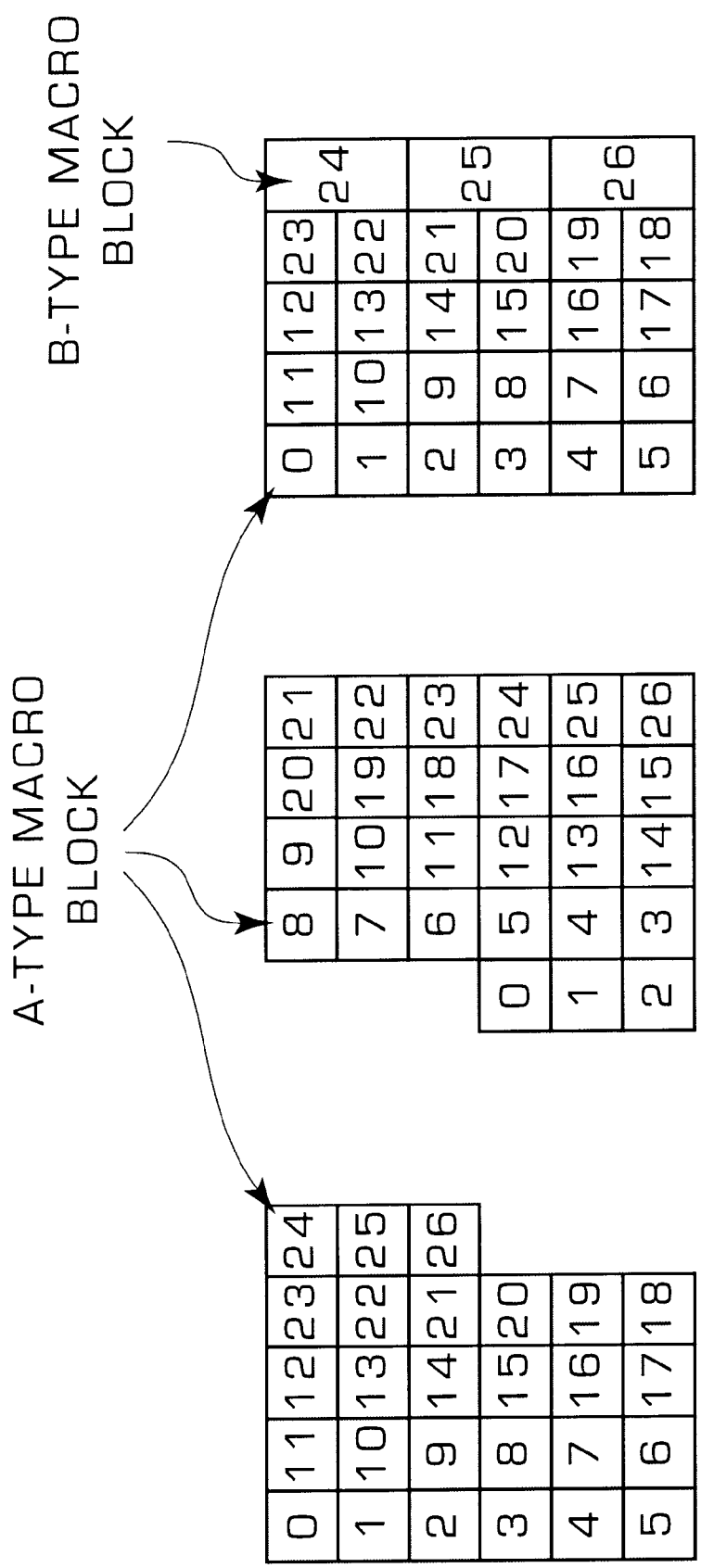
Figure 3A:
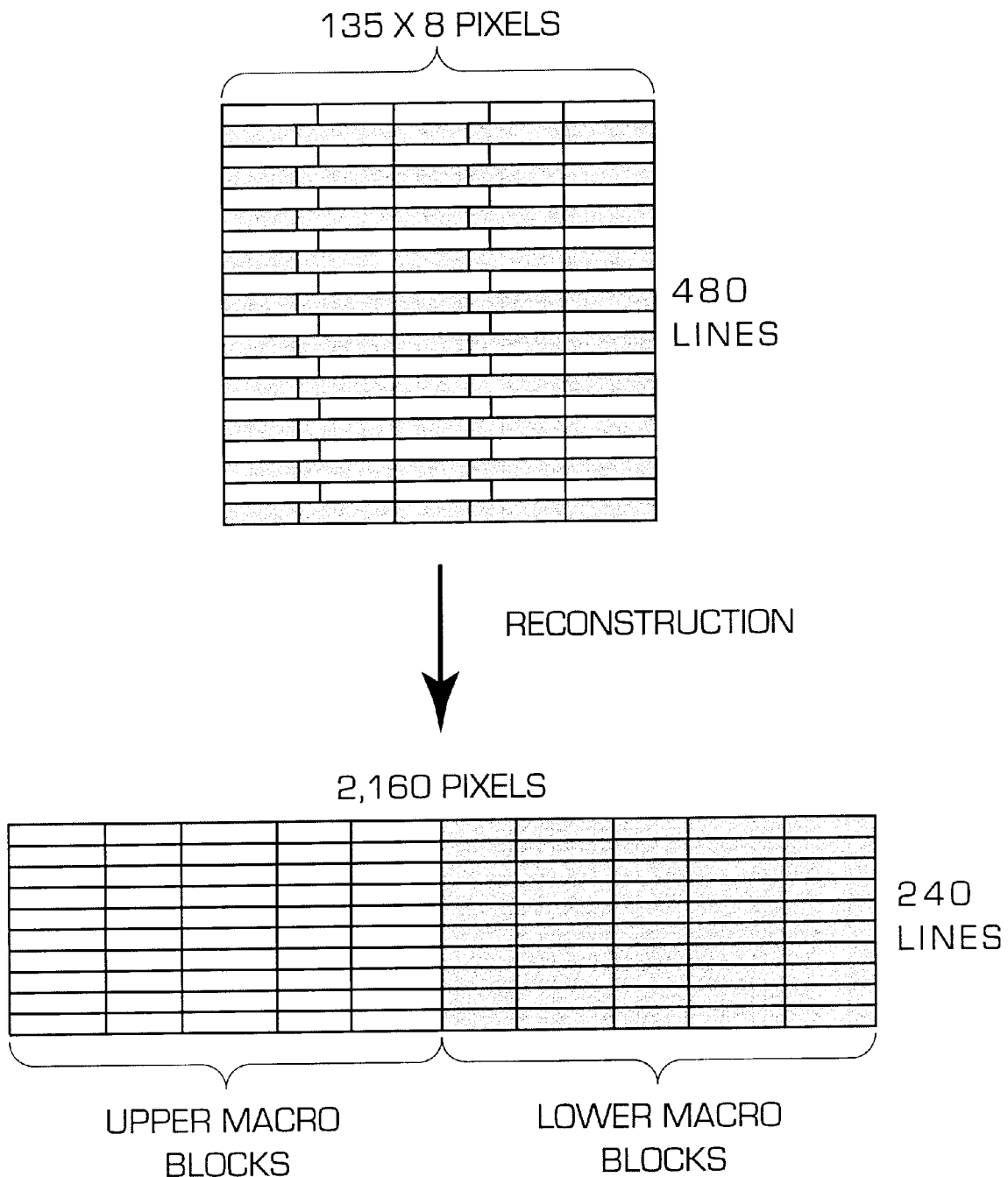
Figure 3B:
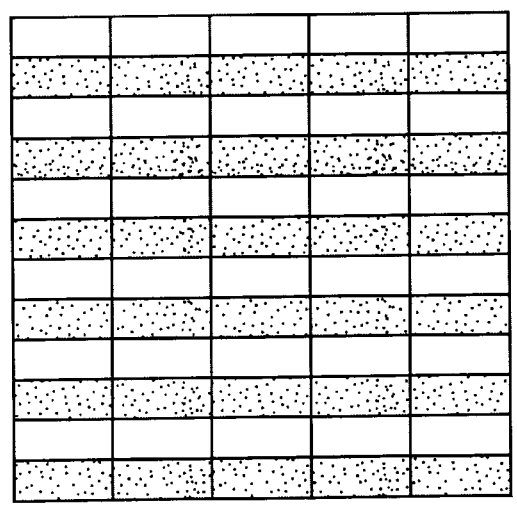
Figure 3B:
Figure 3B:
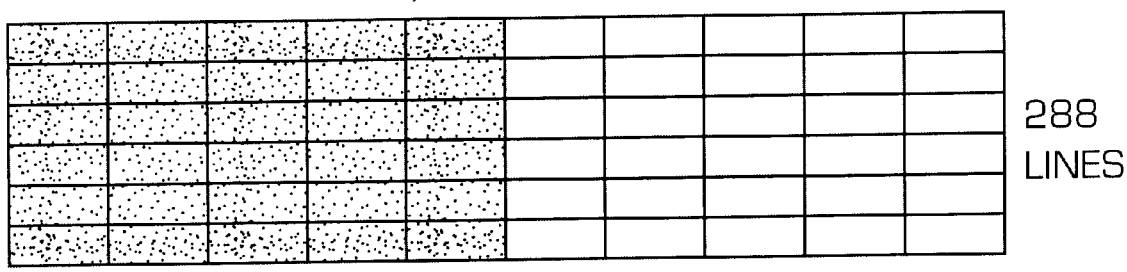
Figure 4:
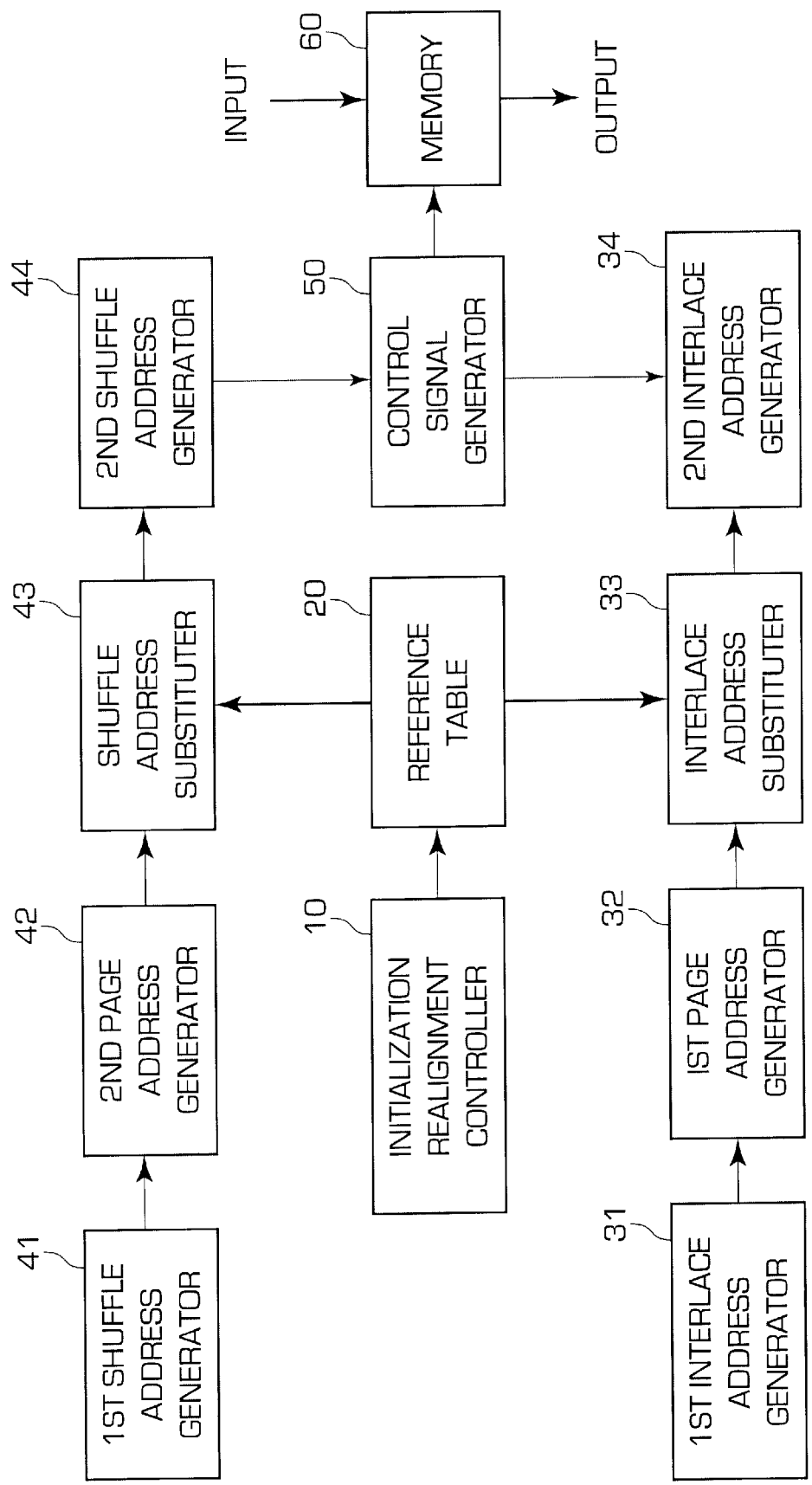
FIG. 4 is a block diagram showing a video shuffling apparatus according to an embodiment of the present invention.

FIG. 4 shows a video shuffling apparatus according to an embodiment of the present invention considering the above-described matters. The existing 525/60 system use the super block structures in which 3 macro block rows located in a relatively upper portion within each super block and 3 macro block rows located in a relatively lower portion therein have a different number of macro blocks, as shown in FIG. 2D. Consequently, it is not so easy to design an address generator for reading the video data stored in a memory. Thus, the present invention bisects the macro blocks within each super block into upper macro blocks and lower macro blocks to store video data of one frame in a memory as shown in FIG. 3A. In other words, the memory is reconstructed so that video data of the upper macro blocks within a frame is stored in the left area of the memory and that of the lower macro blocks within the frame is stored in the right area of the memory. In FIG. 3, the macro blocks which are relatively thin shaded are the upper macro blocks of the super blocks and those which are relatively thick shaded are the lower macro blocks.

The 625/50 system includes macro blocks in which different super blocks have the same number of macro blocks, differently from the super blocks of the 525/60 system. However, it is preferable that a memory be reconstructed to accommodate both the video frame of the 525/60 system and that of the 625/50 system.

Thus, the present invention reconstructs a memory in such a manner that video data of the even-numbered super block rows in the 625/50 system is stored in the left area of the memory and that of the odd-numbered super block rows therein is stored in the right area of the memory. In FIG. 3B, the super blocks which are relatively thick shaded belong to the even-numbered super block rows, and those which are relatively thin shaded belong to the odd-numbered super block rows.

The present invention also uses a memory having the size adapted in the 625/50 system requiring the relatively large data capacity for video frame. Since one frame of the video data for the 625/50 system is composed of 2,160 pixels by 288 lines, a memory 60 shown in FIG. 4 has a memory size for recording video data of one frame in 625/50 system, that is, 622,080 bytes, and also has horizontal and vertical sizes corresponding to 2,160 pixels by 288 lines.

Also, the present invention records video data of a next frame sequentially, continuously using a vertical axis address with respect to the memory position from which the video data of a current frame is read by shuffle addressing, in order to perform continuous shuffling with respect to the video frames. Although the video data of each frame is sequentially input from the first line of the odd field to the last line of the even field, the memory position on which the video data is recorded successively varied whenever the frame is changed. In other words, a particular position on a video frame is not mapped on a particular position in a memory, but video data is stored in such a position that a particular position on a video frame is mapped on a varying position in the memory whenever a frame is changed. Thus, a separate memory is needed to store information related to memory position on which video data is actually stored. Since writing and reading should be independently controlled and 5 super block columns should be separately controlled, the separate memory requires the size of 25,920 bits (=9×288×5×2 bits) to store the memory position information. The reference table 20 which stores reference values relating to pages for partitioning the memory 60 into 36 pages along the vertical direction, includes a memory size of 2,160 bits (=6×36×5×2 bits). Each reference value is used for substituting page address. For clarity of explanation, the separate memory will be called a reference table 20. The reference table 20 stores reference values for designating a currently generated interlace or shuffle address in a temporally adapted memory page to prevent time conflicting in the memory 60.

A first interlace address generator 31 generates a first interlace address according to an interlace addressing method for shuffling in the digital VCR standard. A first shuffle address generator 41 generates a first shuffle address according to a shuffle addressing method for shuffling in the digital VCR standard. The first interlace and the first shuffle addresses are used for designating each line of video data of one frame stored in the memory 60. A first page address generator 32 generates a first page address using the following equation (1) with the first interlace address generated by the first interlace address generator 31.

$$pv1=gv1/8 \qquad \ldots (1)$$

Here, pv1 indicates a first page address and gv1 indicates a first interlace address generated by the first interlace address generator 31.

A second page address generator 42 generates a second page address using the following equation (2) with the first shuffle address generated by the first shuffle address generator 41.

$$pv2=gv2/16\times 2+gv2\%2 \qquad \ldots (2)$$

Here, pv2 indicates a second page address and gv2 indicates a first shuffle address generated by the first shuffle address generator 41. Also, % is a module operator. The first and the second page addresses are used for at a time designating 8 lines of each super block stored in the memory 60.

An initialization/realignment controller 10 which determines reference values used by an interlace address substitute 33 and a shuffle address substitute 43, among the reference values stored in a reference table 20, determines another reference values as usable values whenever a frame is changed. The reference values stored in the reference table 20 are initialized and realigned under control of the initialization/realignment controller 10. In an initialization operation of the FIG. 4 apparatus, the initialization/realignment controller 10 makes the interlace address substitute 33 and a shuffle address substituter 43 use reference values filled in sequence of 0, 1, 2, . . . , 35.

The interface address substituter 33 generates a first substituted page address using the reference value of the reference table 20 corresponding to a first page address. The shuffle address substituter 43 generates a second substituted page address using the reference value of the reference table 20 corresponding to a second page address.

The page substitution using a reference value is based on the facts that a read address being used for reading video data recorded on the memory 60 is the same as a write address for writing video data of the next frame in the memory 60, and that a read address for a current frame is the same as that obtained by shuffling a read address for a previous frame. The second substituted page address and the first substituted page address in each super block column are determined according to the following equations (3) and (4), respectively.

$$Pn[i]=SFL[sh][P_{n-1}[i]] \qquad \ldots (3)$$

$$Qn[i]=P_{n-1}[i] \qquad \ldots (4)$$

Here, n is a frame number, $P_n[\ ]$ is a second substituted page address, Qn[ ] is a first substituted page address, sh (=0, 1, 2, 3, 4) is a super block column number, and i (=0, 1, 2, . . . , 35) represents 36 pages described relating to FIGS. 3A and 3B. SFL[sh][i] which is a reference value used for page address substitution for shuffling, is given by the following equation (5).

$$SFL[sh][i]=(((i+VK[sh]\%36\times 18)\%35, \text{ when } i+VK[sh]<35; =35, \text{ when } i+VK[sh]=35 \qquad \ldots (5)$$

Here, VK[ ]={0, 18, 6, 24, 12}, which is a number of macro blocks located above the super block expressed as number "0" within each super block column in the case when the memory 60 is filled according to the interlace addressing of the digital VCR standard.

Figure 5A:
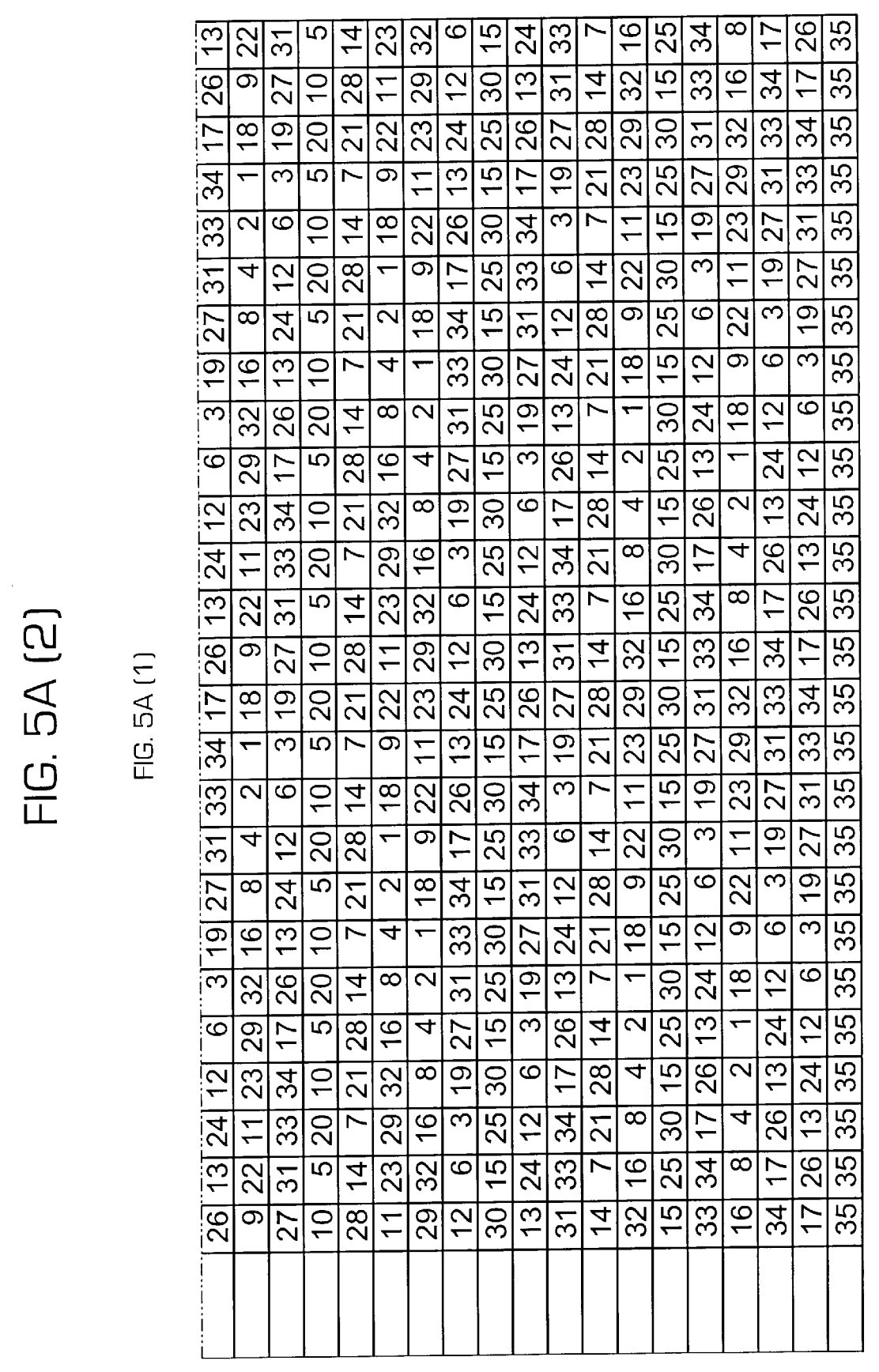
Figure 5B:
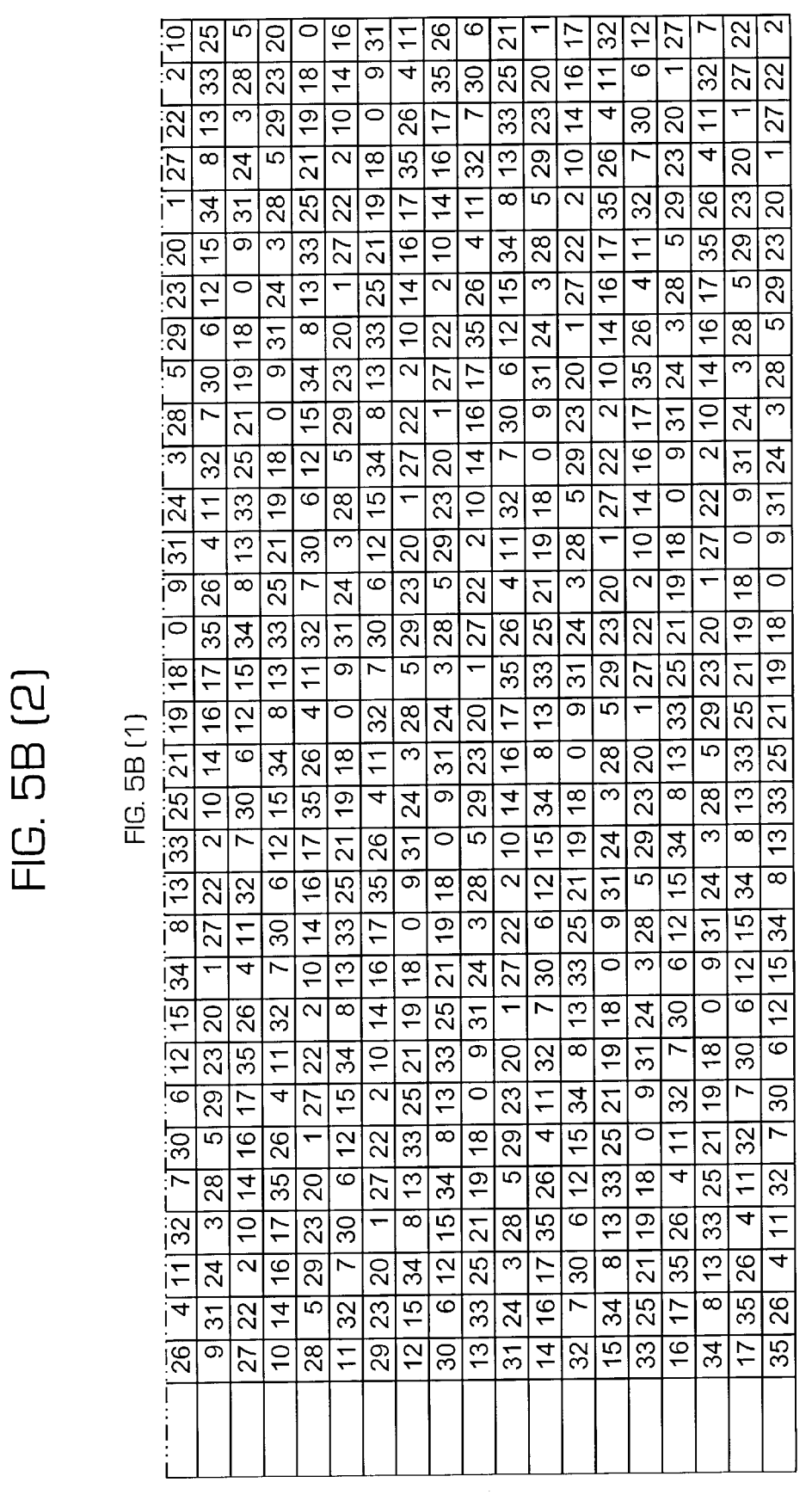
Figure 5C:
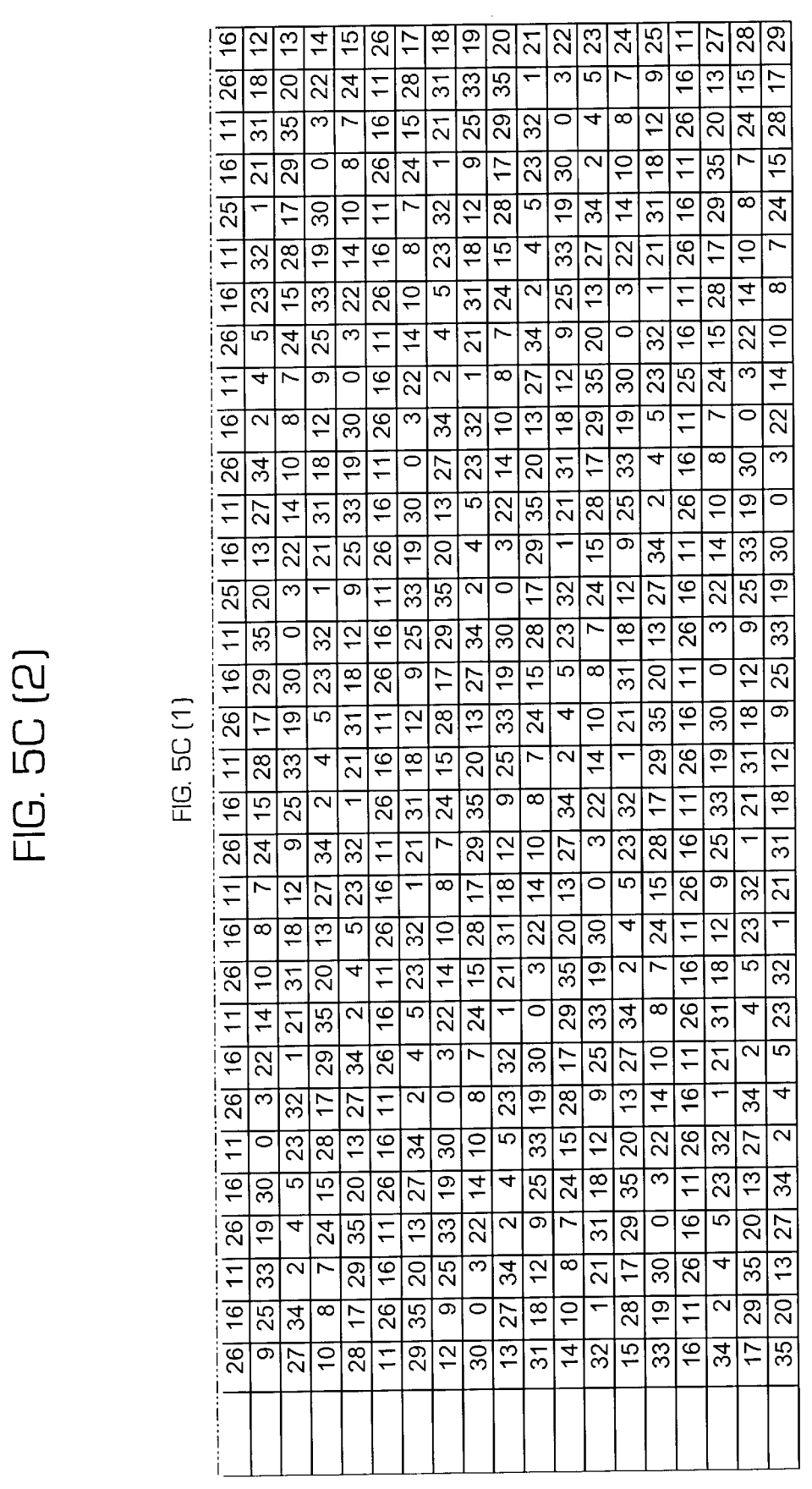
Figure 5D:
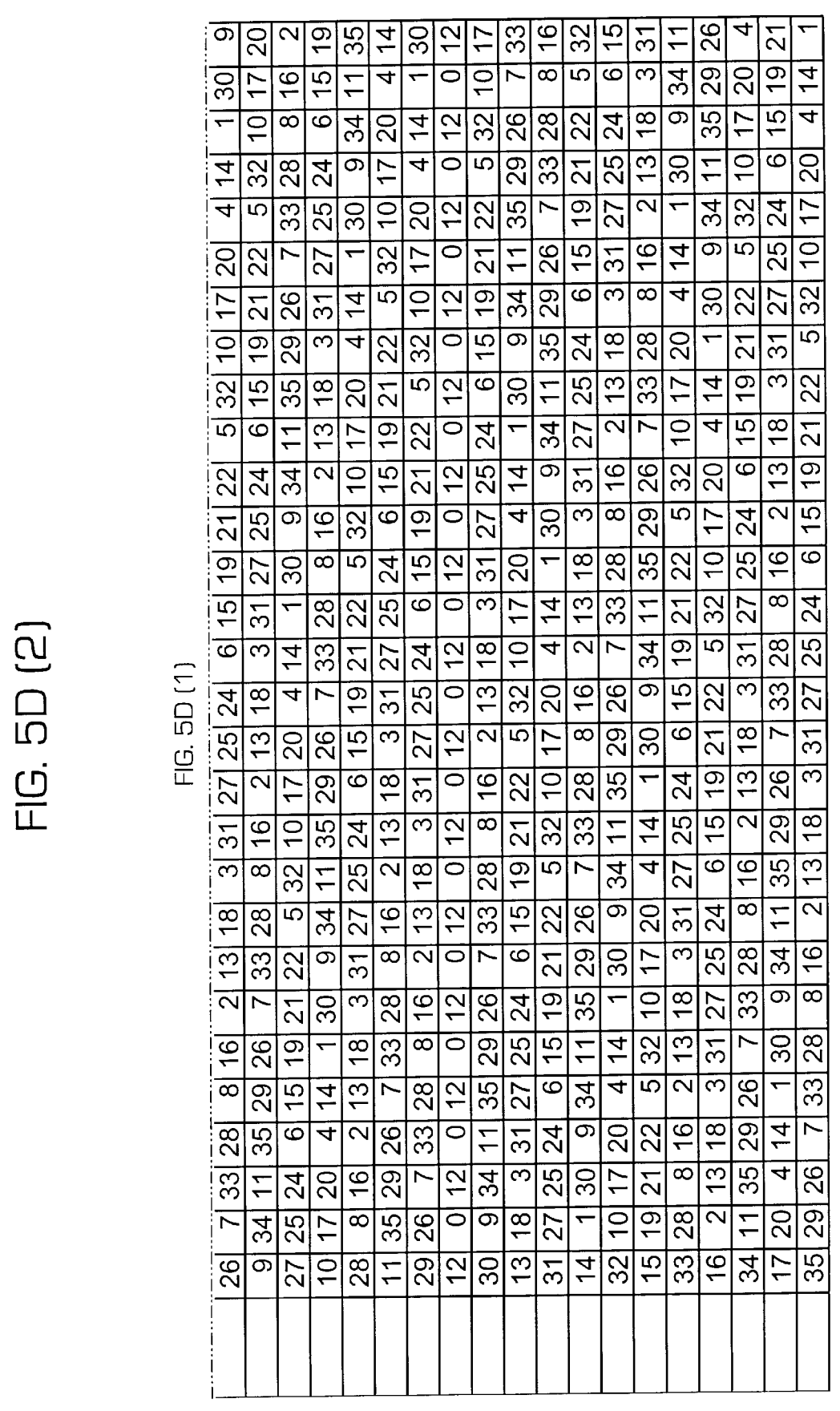
Figure 5E:
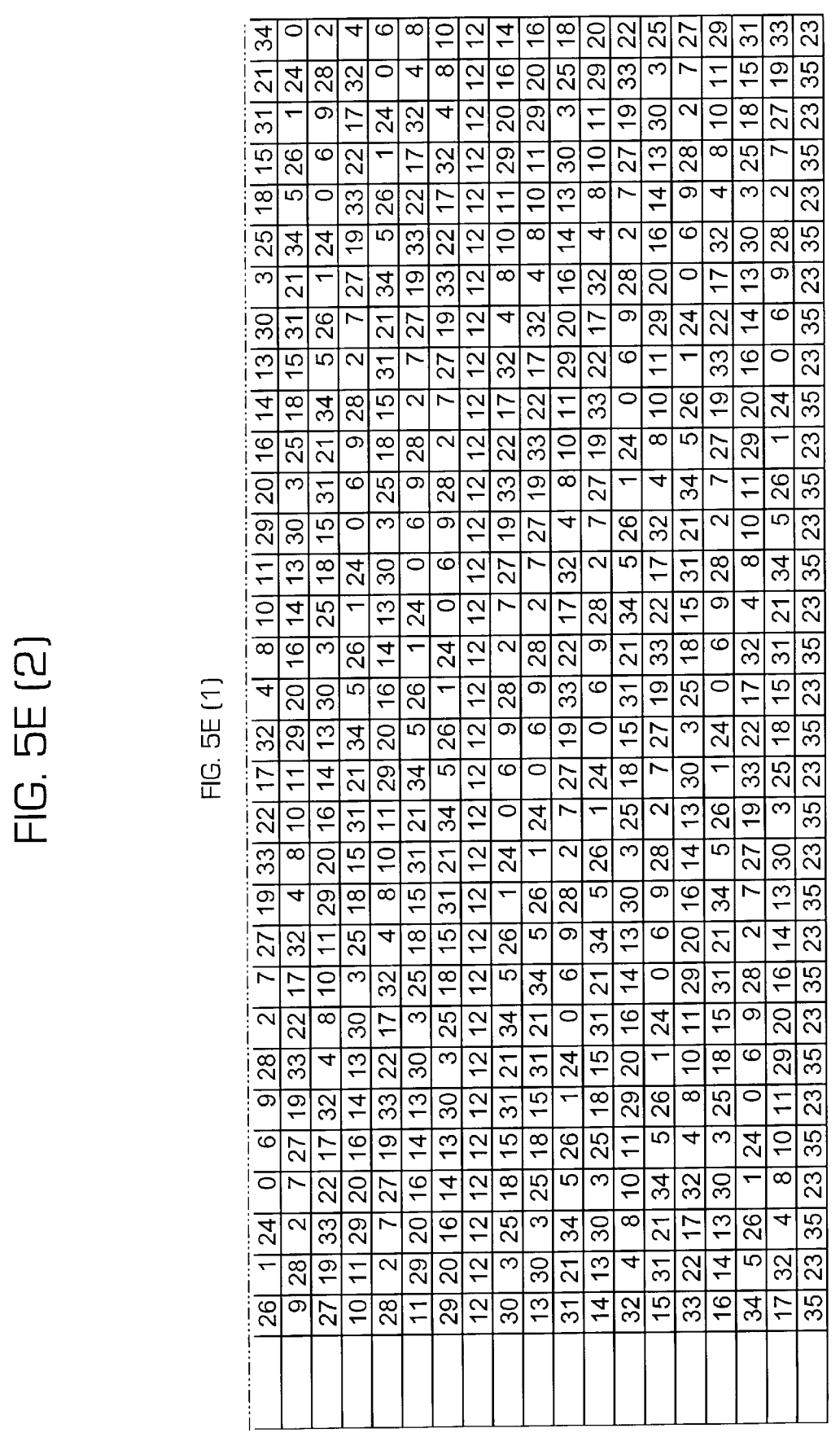

FIGS. 5A through 5E show tables generated by using the equation (5). FIG. 5A shows reference values when sh=0 and VK[sh]=0, FIG. 5B shows reference values when sh=1 and VK[sh]=18, FIG. 5C shows reference values when sh=2 and VK[sh]=6, FIG. 5D shows reference values when sh=3 and VK[sh]=24, and FIG. 5E shows reference values when sh=4 and VK[sh]=12.

The first substituted page address generated by the interlace address substituter 33 is input to a second interlace address generator 34 and the second substituted page address generated by the shuffle address substituter 43 is input to a second shuffle address generator 44. The second interlace address generator 34 calculates a second interlace address rv1 from the first substituted page address using the following equation (6)

$$rv1=Q[gv1/8]\times 8+gv1\%8 \qquad \ldots (6)$$

The second shuffle address generator 44 calculates a second shuffle address rv2 from the second substituted page address using the following equations (7).

$$rv2=P[gv2/8+gv2\%2]\times 8+gv2/2\%8 \qquad \ldots (7)$$

The generated second interlace address and second shuffle address are supplied to a control signal generator 50.

Figure 6A:
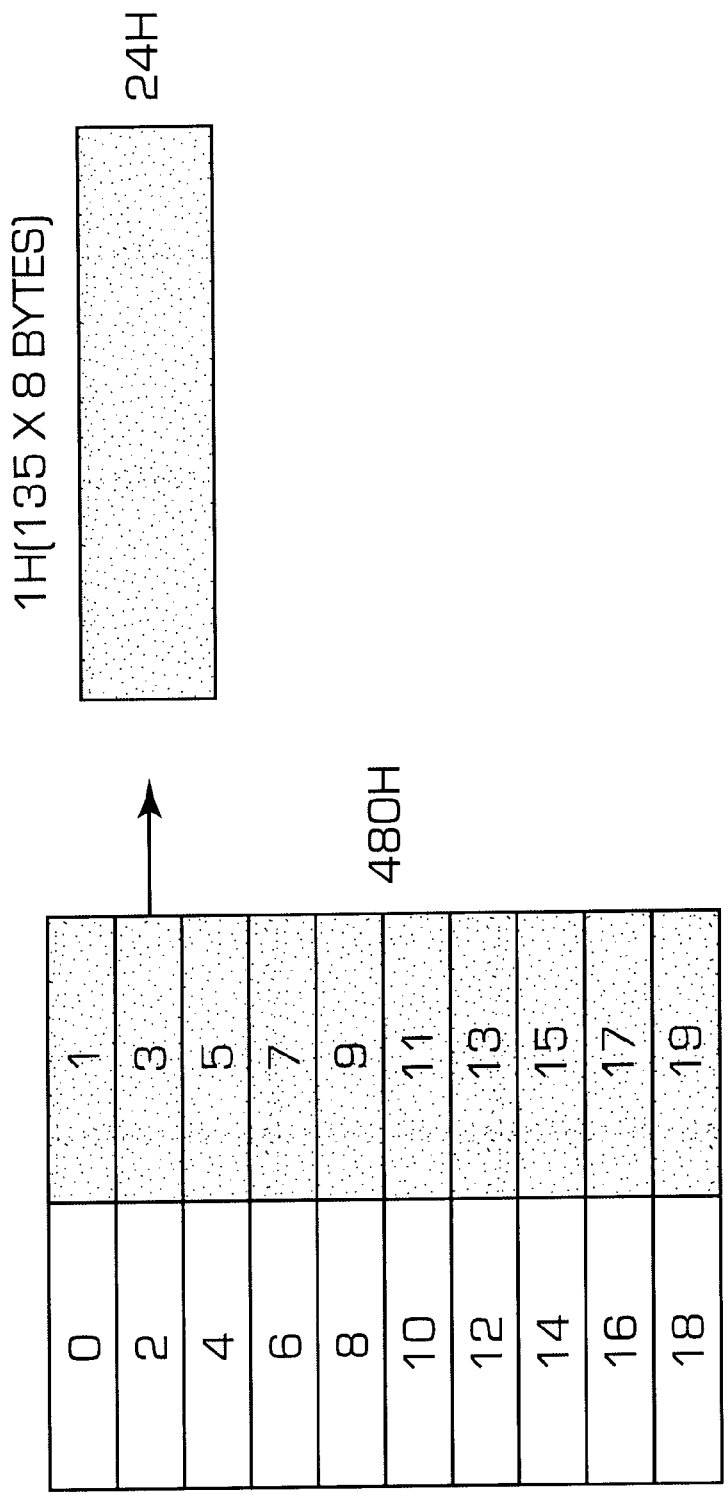
FIGS. 6A and 6B are views for explaining the operation of a first interlace address generator in the FIG. 4 apparatus.
Figure 6B:
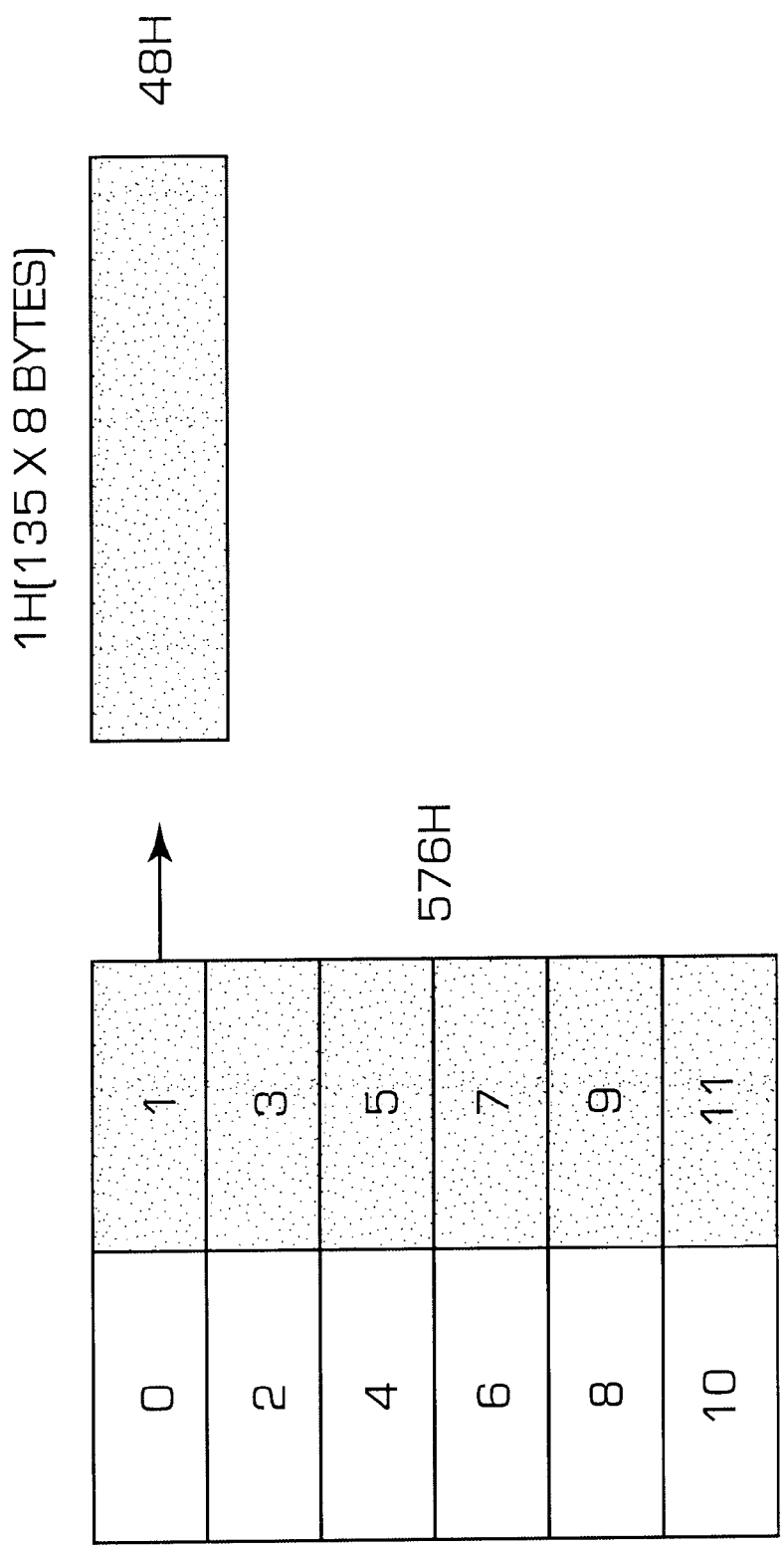

The control signal generator 50 outputs the video data of current frame recorded on the memory 60 and records the video data input to the memory 60 on a position from which the recorded video data has been read, using the second interlace and the second shuffle addresses supplied from the second interlace address generator 34 and the second shuffle address generator 44. In case of the 525/60 system, the left area and the right area of the memory 60 are alternately addressed in unit of 24 lines, as shown in FIG. 6A. In case of the 625/50 system, the left area and the right area of the memory 60 are alternately addressed in units of 48 lines, as shown in FIG. 6B. Numbers in the blocks of FIG. 6A represent the writing sequence of video data of a frame in 525/60 system, and numbers in the blocks of FIG. 6B represent writing sequence of video data of a frame in 625/50 system.

In the case that a second interlace address is used as a write address and a second shuffle address is used as a read address with respect to the memory 60, the control signal generator 50 reads out video data of a current frame stored in the memory 60 using the second shuffle address. The control signal generator 50 uses the second shuffle address as a write address for writing video data of a next frame in the memory 60, and then records video data of next frame in the memory 60. The control signal generator 50 reads out video data of a next frame recorded on the memory 60, using a new second shuffle address capable of shuffling the video data of next frame recorded on the emory 60. Therefore, optimal shuffling is performed in the memory 60.

It is possible that a second shuffle address is used as a write address and a second interlace address is used as a read address with respect to the memory 60. In this case, the control signal generator 50 reads out video data of a current frame recorded on the memory 60 using the second interlace address, and writes video data of a next frame in the memory 60 according to a second shuffle address which writes the video data of a next frame in the memory 60 in the form that the video data of a next frame is shuffled.

Figure 7:
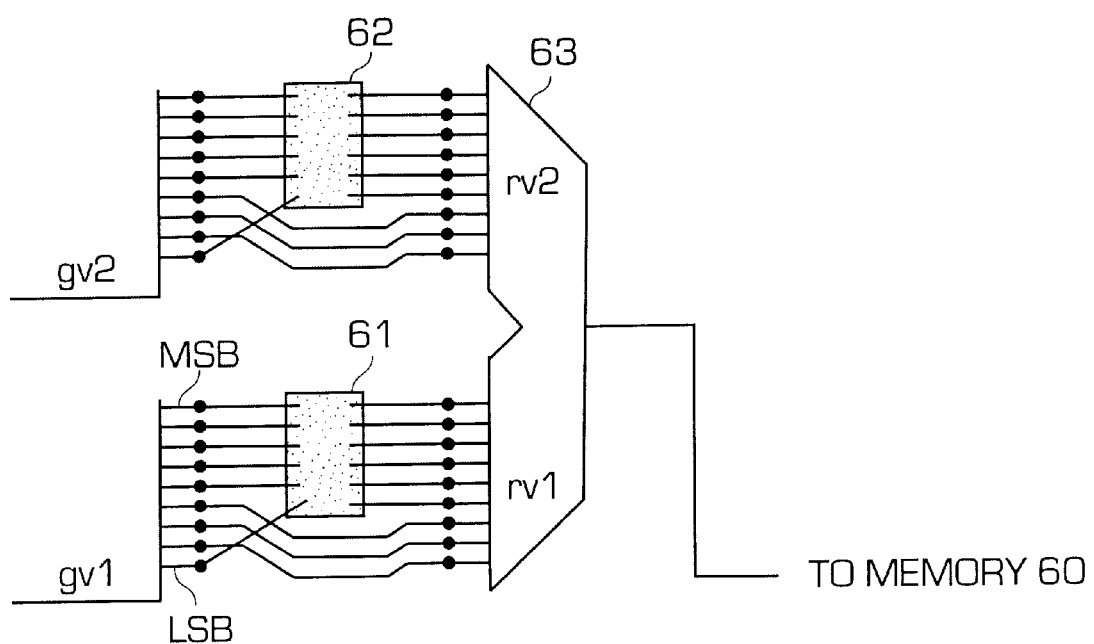
FIG. 7 is a circuit diagram for explaining modification of the interlace address and the shuffle address for shuffling in the digital VCR standard by using page address.

FIG. 7 shows an example implemented in hardware for generating a second interlace address and a second shuffle address using a first interlace address and a first shuffle address.

Referring to FIG. 7, in case of interlace addressing, a second interlace address rv1 is obtained by adding a substituted address by a substituted interlace address generator 61 to the least significant three bits of the first interlace address gv1. In case of shuffling addressing, a second shuffle address rv2 is obtained by adding an address substituted by a substituted interlace address generator 62 and the least significant three bits of the second shuffle address gv2 which is shifted toward the least significant bit by one bit.

The interlace address and the shuffle address are input to a multiplexer 63. The multiplexer 63 supplies the second interlace address and the second shuffle address to the memory 60, selectively, so that shuffling according to the present invention is performed.

As described above, the video data shuffling method and apparatus can sequentially shuffle video frames even using a single memory. Thus, a memory is optimally controlled for shuffling, to thereby provide an optimal hardware design.

While only certain embodiments of the invention have been specifically described herein, it will apparent that numerous modifications may be made thereto without departing from the spirit and scope of the invention.

What is claimed is:

1. A video shuffling apparatus for shuffling video data based on a shuffling system of digital video cassette recorder (VCR) standard, the video shuffling apparatus comprising:
   a first address generator for generating a first interlace address and a first shuffle address according to interlace addressing and shuffle addressing based on the shuffling system;
   a memory which has a storage capacity for the video data of a frame;
   a second address generator for generating a second interlace address and a second shuffle address by using the first interlace address and the first shuffle address, wherein a second shuffle address for reading the video data of a previous frame from said memory is the same as a second interlace address for writing the video data of a current frame in said memory, and a second shuffle address for reading the video data of the current frame from said memory is the same as a second interlace address for writing the video data of a next frame in said memory; and
   a controller for controlling said memory according to a first mode for writing input video data to said memory using said second interlace address and reading out the video data recorded in said memory using said second shuffle address, or a second mode for writing input video data to said memory using said second shuffle address and reading out the video data recorded in said memory using said second interlace address, to thereby continuously shuffle video data frames.

2. The video shuffling apparatus according to claim 1, wherein a shuffling operation is continuously performed with respect to a frame of video data of one of a 625/50 system and a 525/60 system.

3. The video shuffling apparatus according to claim 2, wherein said memory has a storage capacity for video data of one frame in the 625/60 system.

4. The video shuffling apparatus according to claim 3, wherein said second address generator comprises:
   a reference table for storing reference values related to pages which partition said memory in the manner that one frame of video data is divided along the vertical direction;
   a first substituted address generator for generating a first substituted page address using said first interlace address generated by said first address generator and a corresponding reference value stored in said reference table:
   a second substituted address generator for generating a second substituted page address using said first shuffle address generated by said first address generator and a corresponding reference value stored in said reference table;
   an interlace address generator for generating said second interlace address using the first substituted page address generated by said first substituted address generator;
   a shuffle address generator for generating said second shuffle address using the second substituted page address generated by said second substituted address generator; and
   an initialization/realignment controller for determining reference values which are used for generating the first and the second substituted page addresses.

5. The video shuffling apparatus according to claim 4, wherein said initialization/realignment controller determines, in units of a frame, reference values used for generating said first and said second substituted page addresses.

6. The video shuffling apparatus according to claim 5, wherein said first substituted address generator comprises:
   said page address generator for generating the page address corresponding to said first interlace address received from said first address generator; and
   an address substituter for generating the first substituted page address using a page address generated by said page address generator and a corresponding reference value stored in said reference table.

7. The video shuffling apparatus according to claim 5, wherein said second substituted address generator comprises:
   a page address generator for generating the page address corresponding to said first shuffle address received from said first address generation means; and an address substituter for generating the second substituted address using said page address generated by said page address generator and a corresponding reference value stored in said reference table.

8. A video shuffling method using a single memory, the method comprising the steps of:

(a) generator a first interlace address and a first shuffle address to shuffle video data, in units of a frame, according to a shuffling system of digital video cassette recorder (VCR) standard;

(b) generating a second interlace address and a second shuffle address by using the first interlace address and the first shuffle address, wherein a second shuffle address for reading out the video data of a previous frame from said memory is the same as a second interlace address for writing the video data of a current frame in said memory, and a second shuffle address for reading out the video data of the current frame from said memory is the same as a second interlace address for writing the video data of next frame in said memory; and (c) continuously shuffling the video data of frames according to a first mode for writing input video data to said memory using said second interlace address and reading out the video data recorded in said memory using said second shuffle address, or a second mode for writing input video data to said memory using said second shuffle address and reading out the video data recorded in said memory using said second interlace address.

9. The video shuffling method using single memory according to claim 8, wherein a shuffling operation with respect to video data frames in a 625/60 system is continuously performed.

10. The video shuffling method using single memory according to claim 8 wherein a shuffling operation with respect to video data frames in a 525/60 system is continuously performed.

11. The video shuffling method using single memory according to claim 8, wherein said step (b) comprising the sub-steps of:

(b1) setting reference values related to pages which partition said memory in the manner that one frame of video data is divided along the vertical direction;

(b2) generating a first substituted page address using said first interlace address generated in step (a) and a corresponding reference value set in sub step (b1);

(b3) generating a second substituted page address using said first shuffle address generated in step (a) and a corresponding reference value set in sub-step (b1);

(b4) generating said second interlace address using the first substituted page address generated in sub-step (b2); and (b5) generating said second shuffle address using the second substituted page address generated in sub-step (b3).

* * * * *